(12) United States Patent
Jang et al.

(10) Patent No.: US 9,309,117 B2
(45) Date of Patent: Apr. 12, 2016

(54) OXYGEN GENERATING APPARATUS AND AIR CONDITIONER

(75) Inventors: JaeSoo Jang, Seoul (KR); Bongjo Sung, Seoul (KR); Hyungho Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 594 days.

(21) Appl. No.: 13/638,138

(22) PCT Filed: Mar. 25, 2011

(86) PCT No.: PCT/KR2011/002090
§ 371 (c)(1),
(2), (4) Date: Sep. 28, 2012

(87) PCT Pub. No.: WO2011/122803
PCT Pub. Date: Oct. 6, 2011

(65) Prior Publication Data
US 2013/0014534 A1    Jan. 17, 2013

(30) Foreign Application Priority Data
Mar. 31, 2010 (KR) .................. 10-2010-0029039

(51) Int. Cl.
C01B 13/02     (2006.01)
C01B 15/027    (2006.01)
C25B 1/30      (2006.01)
F24F 3/16      (2006.01)

(52) U.S. Cl.
CPC ........... C01B 13/0214 (2013.01); C01B 15/027 (2013.01); C25B 1/30 (2013.01); F24F 2003/1692 (2013.01)

(58) Field of Classification Search
CPC ....... A61L 9/00; A61L 9/015; C01B 13/0214; C01B 15/027; C25B 1/30; F24F 2003/1692
See application file for complete search history.

(56) References Cited

U.S. PATENT DOCUMENTS

| | | |
|---|---|---|
| 2,811,490 A | 10/1957 | Sherwood |
| 4,061,554 A | 12/1977 | Chillier-Duchatel et al. |
| 4,488,951 A | 12/1984 | Nolan et al. |
| 6,361,584 B1 * | 3/2002 | Stevens et al. ................ 95/96 |
| 6,685,818 B2 | 2/2004 | Lehmann et al. |
| 6,712,949 B2 | 3/2004 | Gopal |

(Continued)

FOREIGN PATENT DOCUMENTS

| | | |
|---|---|---|
| CN | 1420312 | 5/2003 |
| DE | 37 27 630 | 10/1988 |

(Continued)

OTHER PUBLICATIONS

English translation of JP 2003-229165, Aug. 15, 2003.*

(Continued)

*Primary Examiner* — Regina M Yoo
(74) *Attorney, Agent, or Firm* — KED & Associates LLP

(57) ABSTRACT

Provided is an oxygen generating apparatus. The oxygen generating apparatus includes a hydrogen peroxide generator configured to generate hydrogen peroxide; an oxygen generator configured to generate oxygen using the hydrogen peroxide generated in the hydrogen peroxide generator; a first pipe configured to transfer the hydrogen peroxide generated in the hydrogen peroxide generator into the oxygen generator; and a second pipe configured to transfer water generated in the oxygen generator into the hydrogen peroxide generator.

19 Claims, 3 Drawing Sheets

(56) References Cited

U.S. PATENT DOCUMENTS

| | | | |
|---|---|---|---|
| 6,767,447 B2 | 7/2004 | Uno et al. | |
| 2003/0230196 A1* | 12/2003 | Kim | 96/4 |

FOREIGN PATENT DOCUMENTS

| | | |
|---|---|---|
| EP | 1918248 | 5/2008 |
| JP | 09-279377 | 10/1997 |
| JP | 2003-229165 | 8/2003 |
| JP | 2005-110751 | 4/2005 |
| KR | 10-2005-0100516 | 10/2005 |
| KR | 10-2005-0112637 | 12/2005 |
| WO | WO 2009/006586 | 1/2009 |

OTHER PUBLICATIONS

Chinese Office Action dated Jan. 3, 2014. (translation).
International Search Report issued in PCT Application No. PCT/KR2011/002090 dated Dec. 26, 2011.
Hayoung Lim et al. 2006 KSPE Spring Conference, pp. 283-287, 2006.
European Search Report dated Sep. 20, 2013.
Hayoung Lim et al., 2006 KSPE Spring Conference, pp. 283-287, 2006, Characteristics and Applications of Green Propellant "Hydrogen Peroxide".

\* cited by examiner

US 9,309,117 B2

OXYGEN GENERATING APPARATUS AND AIR CONDITIONER

TECHNICAL FIELD

The present disclosure relates to an oxygen generating apparatus and an air conditioner.

BACKGROUND ART

In general, an oxygen generating apparatus represents an apparatus for generating oxygen to supply the generated oxygen to a place at which oxygen is needed. In oxygen generating apparatus according to a related art, air is sucked into a compressor to compress the sucked air and pass through zeolite, thereby generating oxygen. Alternatively, air compressed by a compressor passes through a membrane to generate oxygen, or water is electrolyzed to split water molecules into hydrogen and oxygen.

DISCLOSURE OF INVENTION

Technical Problem

Embodiments provide an oxygen generating apparatus, which is not limited to its installation, quickly generates oxygen, and has a compact structure, and an air conditioner including the same.

Embodiments also provide an oxygen generating apparatus having low power consumption and an air conditioner including the same.

Solution to Problem

In one embodiment, an oxygen generating apparatus includes: a hydrogen peroxide generator configured to generate hydrogen peroxide; an oxygen generator configured to generate oxygen using the hydrogen peroxide generated in the hydrogen peroxide generator; a first pipe configured to transfer the hydrogen peroxide generated in the hydrogen peroxide generator into the oxygen generator; and a second pipe configured to transfer water generated in the oxygen generator into the hydrogen peroxide generator.

In another embodiment, an oxygen generating apparatus includes: an oxygen generator configured to receive hydrogen peroxide to decompose the hydrogen peroxide into water and oxygen, thereby discharging the oxygen; a hydrogen peroxide generator configured to generate hydrogen peroxide using air supplied from the outside and the water recovered in the oxygen generator; and a pump configured to pump the hydrogen peroxide or the water between the oxygen generator and the hydrogen peroxide generator.

In further another embodiment, an air conditioner includes: an indoor unit for air-conditioning indoor air; an oxygen generator disposed in the indoor unit, the oxygen generator for receiving hydrogen peroxide to decompose the hydrogen peroxide into water and oxygen, thereby discharging the oxygen; an outdoor unit connected to the indoor unit through a refrigerant pipe; a hydrogen peroxide generator disposed in the outdoor unit, the hydrogen peroxide generator generating hydrogen peroxide using air supplied from the outside and the water recovered in the oxygen generator; a first pipe in which the hydrogen peroxide flows, the first pipe connecting the oxygen generator to the hydrogen peroxide generator; and a second pipe in which the water discharged from the oxygen generator flows, the second pipe connecting the oxygen generator to the hydrogen peroxide generator.

The details of one or more embodiments are set forth in the accompanying drawings and the description below. Other features will be apparent from the description and drawings, and from the claims.

Advantageous Effects of Invention

According to the embodiments, since the oxygen generator generates oxygen using the hydrogen peroxide generated in the hydrogen peroxide generator, the hydrogen peroxide generator and the oxygen generator may be reduced in size. Thus, the oxygen generating apparatus may be reduced in its entire size.

Also, since the oxygen generator is independently disposed from the hydrogen peroxide generator, the oxygen generator may not be limited to its installation position.

Also, since air is supplied into the hydrogen peroxide generator and water discharged from the oxygen generator is recovered into the hydrogen peroxide generator, the limitation in which water should be continuously filled may be solved.

Also, since the compressor for compressing air is not required, the power consumption may be reduced.

Also, since hydrogen peroxide is decomposed in the oxygen generator to generate oxygen, the oxygen generating apparatus may be compact in size.

Also, since the reaction enhancement device is disposed inside the oxygen generator, the oxygen generating apparatus may be compact in size.

Also, when the catalyst is used as the reaction enhancement device, since the catalyst is coated on the meshes, the catalyst may be used forever.

Also, since the water discharge port is disposed at a position higher than that of the hydrogen peroxide inlet port, a reaction time of the hydrogen peroxide may be sufficiently secured.

MODE FOR THE INVENTION

Reference will now be made in detail to the embodiments of the present disclosure, examples of which are illustrated in the accompanying drawings.

Figure 1:
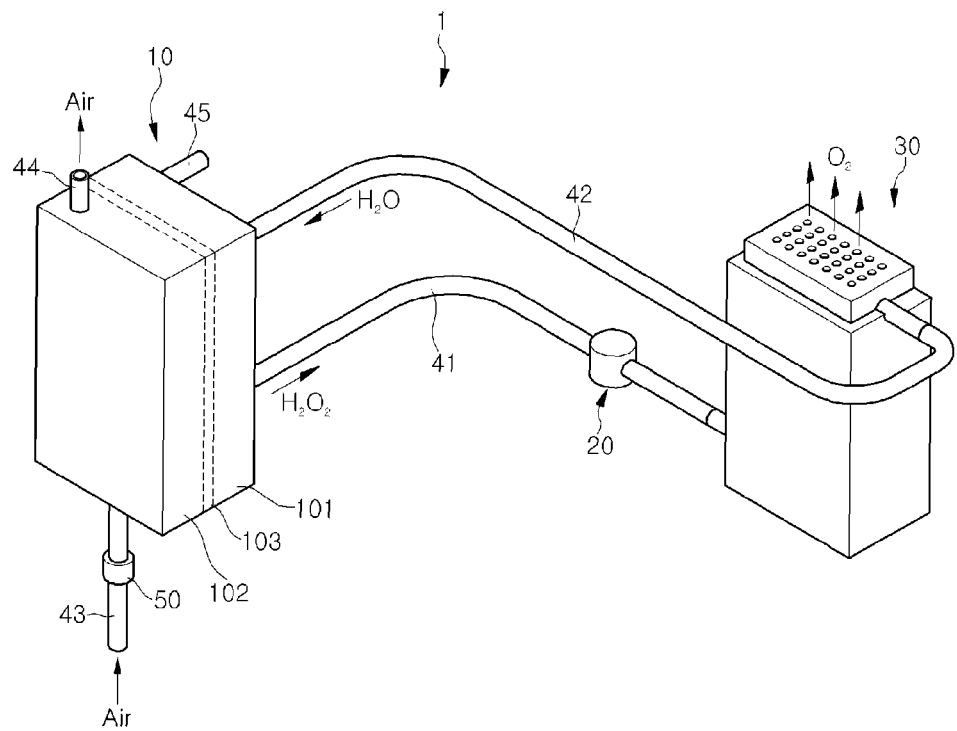
FIG. 1 is a schematic view of an oxygen generating apparatus according to a first embodiment.

FIG. 1 is a schematic view of an oxygen generating apparatus according to a first embodiment.

Referring to FIG. 1, an oxygen generating apparatus 1 includes a hydrogen peroxide generator 10 for generating hydrogen peroxide ($H_2O_2$), a pump 20 for pumping the hydrogen peroxide generated in the hydrogen peroxide generator 10, and an oxygen generator 30 for reducing the hydrogen peroxide pumped by the pump 20 to generate oxygen ($O_2$).

In the current embodiment, the hydrogen peroxide generated and discharged from the hydrogen peroxide generator 10 may be a substantially hydrogen peroxide-containing solution. Thus, in the current embodiment, it may be understood that the hydrogen peroxide is equal to a hydrogen peroxide solution.

The hydrogen peroxide generator 10 and the oxygen generator 30 are connected to each other through a first pipe 41 and a second pipe 42.

The hydrogen peroxide discharged from the hydrogen peroxide generator 10 flows into the first pipe 41 and is introduced into the oxygen generator 30. The pump 20 is disposed on the first pipe 41.

A reaction enhancement device (that will be described later) for enhancing the reduction of the introduced hydrogen peroxide is disposed inside the oxygen generator 30. Thus, the hydrogen peroxide introduced into the oxygen generator 30 is reduced by the reaction enhancement device to generate water and oxygen in the oxygen generator 30.

The generated water is introduced into the hydrogen peroxide generator 10 through the second pipe 42. That is, the water split into water and oxygen in the oxygen generator 30 is recovered into the hydrogen peroxide generator 10. On the other hand, the generated oxygen is discharged from the oxygen generator 30 to the outside. Although the pump 20 is disposed on the first pipe 41 in the current embodiment, the pump 20 may be disposed on the second pipe 42. Alternatively, the pump 20 may be disposed on each of the first and second pipes 41 and 42. Also, the pump 20 may be disposed on the hydrogen peroxide generator 10 or the oxygen generator 30.

The hydrogen peroxide generator 10 includes an anode 101, a cathode 102, and a membrane 103 disposed between the anode 101 and the cathode 102. Although not shown, a power supply part is connected to the anode 101 and the cathode 102.

The hydrogen peroxide generator 10 is connected to an air supply tube 43 for supplying air and an air discharge tube 44 for discharging air. An air pump 50 for supplying air into the hydrogen peroxide generator 10 in a micro-bubble shape is disposed on the air supply tube 43.

A water supply part 45 for filling water is disposed on the hydrogen peroxide generator 10. Although not shown, a tap or valve may be disposed on the water supply part 45. In the current embodiment, the hydrogen peroxide generates hydrogen peroxide using the water recovered into the oxygen generator 30. However, at first, water should be supplied into the hydrogen peroxide generator 10 from the outside.

Thus, after the initial water is supplied into the hydrogen peroxide generator 10 through the water supply part 45, it is unnecessary to additionally supply water into the hydrogen peroxide generator 10. However, in case where water supply is required according to circumstances, water may be resupplied through the water supply part 45.

A reaction formula for generating hydrogen peroxide in the hydrogen peroxide generator 10 is as follow:

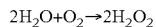

The air supplied through the air supply part 43 contains oxygen. Thus, the oxygen contained in the air supplied into the hydrogen peroxide generator 10 is reacted with the water to generate hydrogen peroxide. Since nitrogen and other components are contained in the air, the nitrogen and other components except oxygen are discharged through the air discharge tube 44.

In the current embodiment, the hydrogen peroxide generator 10 generates the hydrogen peroxide through an electrochemical method.

When air is not supplied into the hydrogen peroxide generator 10, hydrogen bubbles are generated in the hydrogen peroxide generator 10. In this case, continuous water supply is required. However, according to the current embodiment, since air is continuously supplied into the hydrogen peroxide generator 10, hydrogen is reacted with oxygen contained in the air to generate water, it is unnecessary to continuously supply water.

Patents related to the hydrogen peroxide generator 10 include U.S. Pat. Nos. 6,685,818, 6,712,949, and 6,767,447. A different point between these patents and the current embodiment is that, in the current embodiment, the water discharged from the oxygen generator 30 is recovered into the hydrogen peroxide generator 10 and reused for generating hydrogen peroxide.

Figure 2:
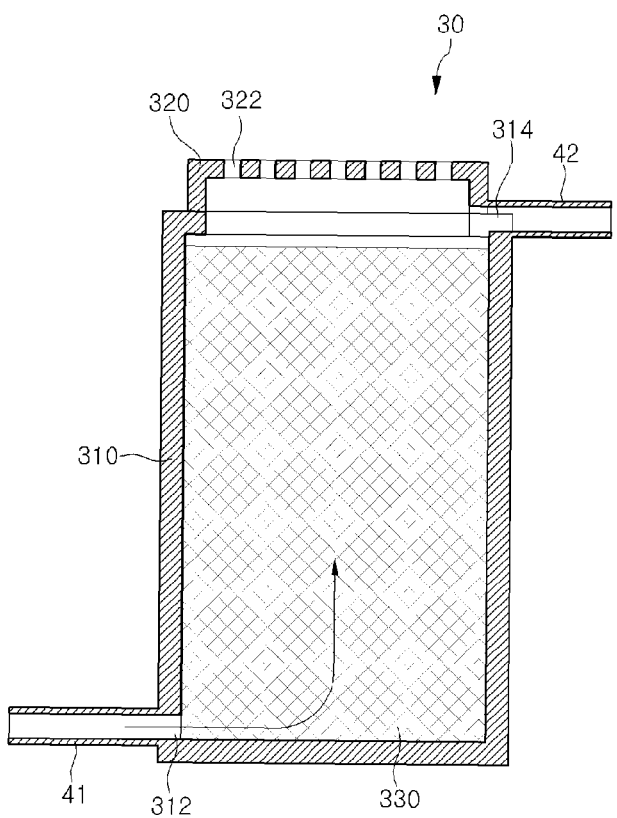
FIG. 2 is a sectional view of the oxygen generating apparatus according to the first embodiment.
Figure 3:
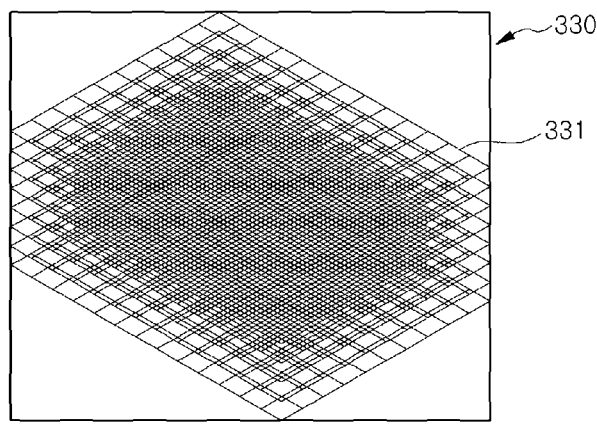
FIG. 3 is a view illustrating an example of a reaction enhancement device constituting the oxygen generating apparatus of FIG. 2.

FIG. 2 is a sectional view of the oxygen generating apparatus according to the first embodiment. FIG. 3 is a view illustrating an example of a reaction enhancement device constituting the oxygen generating apparatus of FIG. 2.

Referring to FIGS. 1 to 3, the oxygen generator 30 according to the current embodiment reduces the introduced hydrogen peroxide to generate oxygen. Water generated during the reduction of the hydrogen peroxide is recovered into the hydrogen peroxide generator 10.

The oxygen generator 30 includes a case 310 for defining a space for receiving hydrogen peroxide and a reaction enhancement device 330 received in the case 310. In the current embodiment, the reaction enhancement device 330 represents a device for enhancing the reduction of the hydrogen peroxide.

A catalyst may be used as the reaction enhancement device 330. The reaction enhancement device 300 includes a plurality of meshes 331 on which the catalyst is coated. As shown in FIG. 3, the plurality of meshes 331 is vertically stacked with each other. In the current embodiment, a reason in which the plurality of meshes 331 is used as the reaction enhancement device 330 is for increasing a contact area with hydrogen peroxide. That is, the hydrogen peroxide passes through holes defined in the plurality of meshes 331 to reduce a reaction time.

In the current embodiment, manganese peroxide, e.g., manganese dioxide or potassium iodide may be used as the catalyst.

The current embodiment has an advantage in that the plurality of meshes 331 is used forever because the plurality of meshes 331 on which the catalyst is coated is disposed inside the oxygen generator 30. That is, for example, when the manganese dioxide is used the catalyst, the manganese dioxide exists in a powder form. Thus, when the manganese dioxide powder exists in the oxygen generator 30, the manganese dioxide powder may be discharged together with water from the oxygen generator 30. In this case, the manganese dioxide may be continuously filled.

However, according to the current embodiment, since the catalyst is coated on each of the meshes 331 through a binder, the above-described limitation may be solved by maintaining the state in which the catalyst is coated on the meshes 331.

A reaction formula of hydrogen peroxide within the oxygen generator 30 is as follow:

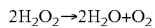

The hydrogen peroxide may be reduced even though the reaction enhancement device 330 is not provided. However, in this case, the reaction time is longer. Thus, in the current embodiment, the hydrogen peroxide is reduced by the separate reaction enhancement device 300 in the oxygen generator 30. In case where the reaction enhancement device 330 is not provided inside the oxygen generator 30, it will be easily guessed that most of the hydrogen peroxide is discharged through the second pipe 42.

The case 310 has a hydrogen peroxide inlet port 312 connected to the first pipe 41 and a water discharge port 314 connected to the second pipe 42. Here, to increase the contact time between the hydrogen peroxide and the reaction enhancement device 330, the hydrogen peroxide inlet port 312 is disposed at a position lowered than that of the water discharge port 314.

Particularly, the hydrogen peroxide inlet port 312 may be disposed at the lowest portion of the case 310, and the water discharge port 314 may be disposed above the reaction enhancement device 330. Also, the first pipe 41 and the second pipe 42 may be connected to side surfaces of the case 310, respectively.

Thus, since the hydrogen peroxide introduced into the case 310 ascends while contacting the mashes 331, a sufficient reaction time for the reduction of the hydrogen peroxide may be secured within the oxygen generator 30. Here, a portion of the reaction enhancement device 330 or the entire reaction enhancement device 330 is disposed between the hydrogen peroxide inlet port 312 and the water discharge port 314.

An oxygen discharge part 320 is disposed at an upper portion (e.g., a top surface of the case 310) of the case 310 so that the oxygen generated in the oxygen generator 30 is easily discharged to the outside. The oxygen discharge part 320 has a plurality of oxygen discharge holes 322.

Here, the oxygen discharge part 320 is disposed at a position higher than that of the water discharge part 314 to prevent water from being discharged through the oxygen discharge part 320.

An application example of the above-described oxygen generating apparatus will be described below.

The oxygen generating apparatus according to the current embodiment may be manufactured in a single module. That is, the hydrogen peroxide generator, the pump, and the oxygen generator may be built in a single housing.

In the current embodiment, since the oxygen generator generates oxygen using hydrogen peroxide generated in the hydrogen peroxide generator, the hydrogen peroxide generator and the oxygen generator may be reduced in size. Thus, the oxygen generating apparatus may be reduced in its entire size.

In addition, since the reaction enhancement device is disposed inside the oxygen generator, the oxygen generating apparatus may be compact in size.

Thus, the modularized oxygen generating apparatus according to the current embodiment may be installed in an indoor space or may be separately installed in an indoor unit of a home appliance, e.g., an air conditioner.

According to the current embodiment, since the oxygen generator generates oxygen by reducing the introduced hydrogen peroxide, the oxygen generator may be independently disposed from the hydrogen peroxide generator. Thus, the oxygen generator may not be limited to its installation position. For example, when the current embodiment is applied to the air conditioner, the oxygen generator may be disposed in an indoor unit for air-conditioning indoor air, and the hydrogen peroxide generator may be disposed in an outdoor unit. Of cause, the indoor unit may be connected to the outdoor unit through a refrigerant pipe.

According to the current embodiment, since air is continuously supplied into the hydrogen peroxide generator, and simultaneously, water discharged from the oxygen generator is recovered into the hydrogen peroxide generator, the limitation in which water should be continuously filled may be solved.

Also, since a compressor for compressing air is not required, power consumption may be reduced.

Figure 4:
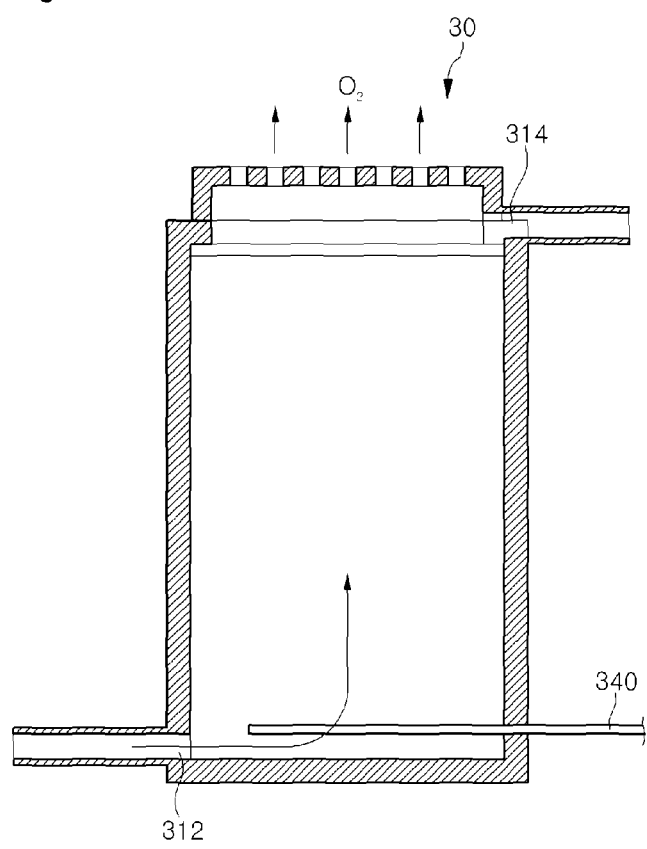
FIG. 4 is a view illustrating the inside of the oxygen generating apparatus according to a second embodiment.

FIG. 4 is a view illustrating the inside of the oxygen generating apparatus according to a second embodiment.

This embodiment is equal to the first embodiment except that a reaction enhancement device disposed within an oxygen generator. Thus, only the characteristic portions of the current embodiment will be described mainly in the following explanation.

Figure 5:
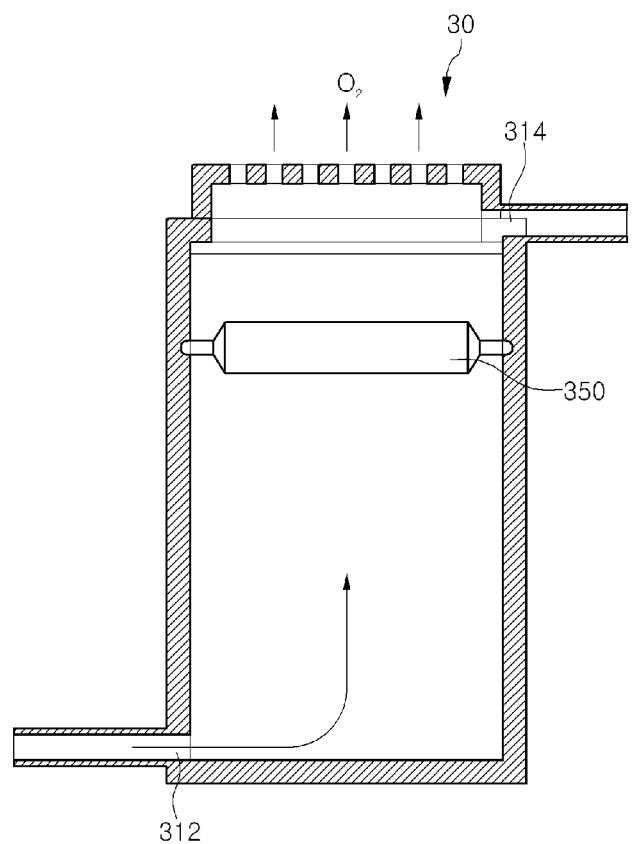
FIG. 5 is a view illustrating the inside of an oxygen generating apparatus according to a third embodiment.

Referring to FIG. 5, an oxygen generator 30 according to the current embodiment includes a heater 340 as a reaction enhancement device for enhancing reduction of introduced hydrogen peroxide. In detail, the heater 340 may be disposed adjacent to a hydrogen peroxide inlet port 312. That is, the heater 340 may be disposed at an inner lower portion of the oxygen generator 30.

This is done for increasing a time at which the hydrogen peroxide receives heat of the heater 340 because the hydrogen peroxide introduced into the oxygen generator 30 ascends. That is, hydrogen peroxide and/or water may receive heat until the hydrogen peroxide and/or water reach(es) a water discharge port 314.

According to the current embodiment, since the hydrogen peroxide receives the heat of the heater 340, a reaction rate (decomposition rate) may be increased.

Although one heater is provided in the current embodiment, a plurality of heaters may be provided in the oxygen generator 30. In this case, the plurality of heaters may be disposed vertically spaced from each other. Alternatively, the plurality of heaters may be horizontally arranged in two lines or more.

FIG. 5 is a view illustrating the inside of an oxygen generating apparatus according to a third embodiment.

This embodiment is equal to the first embodiment except that a reaction enhancement device disposed within an oxygen generator. Thus, only the characteristic portions of the current embodiment will be described mainly in the following explanation.

Referring to FIG. 5, an oxygen generator 30 according to the current embodiment may include a light emitting part 350 as a reaction enhancement device for enhancing reduction of introduced hydrogen peroxide. In detail, for example, an ultraviolet lamp may be used as the light emitting part 350. The light emitting part 350 may be disposed adjacent to a water discharge part 314. The light emitting part 350 may be disposed between the water discharge part 314 and a hydrogen peroxide inlet port 312.

A reason in which the light emitting part 350 is disposed adjacent to the water discharge part 314 is for irradiating light onto is hydrogen peroxide and/or water until the hydrogen peroxide and/or water reach(es) the water discharge port 314.

According to the current embodiment, a reaction rate (decomposition rate) may be increased by the light of the light emitting part 350.

Although one light emitting part is provided in the oxygen generator 30 in the current embodiment, a plurality of light emitting parts may be provided in the oxygen generator 30. In this case, the plurality of light emitting parts may be disposed vertically spaced from each other. Alternatively, the plurality of light emitting parts may be horizontally arranged in two lines or more.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. An oxygen generating apparatus, comprising:
a hydrogen peroxide generator that generates hydrogen peroxide;
an oxygen generator that generates oxygen using the hydrogen peroxide generated in the hydrogen peroxide generator;
a first pipe through which the hydrogen peroxide generated in the hydrogen peroxide generator is transferred into the oxygen generator; and
a second pipe thorough which water generated in the oxygen generator is transferred into the hydrogen peroxide generator, wherein the oxygen generator includes:
a case including an inlet port through which the hydrogen peroxide generated in the hydrogen peroxide generator is introduced, a water discharge port through which the water is discharged, and an oxygen discharge port through which the oxygen is discharged; and
a reaction enhancement device that enhances a reaction of the hydrogen peroxide introduced through the inlet port, and wherein the reaction enhancement device includes a hearer that applies heat into the hydrogen peroxide introduced into the case.

2. The oxygen generating apparatus according to claim 1, wherein the hydrogen peroxide is decomposed in the oxygen generator by the reaction enhancement device to generate oxygen and water, wherein the generated water is discharged through the water discharge port to flow into the hydrogen peroxide generator, and wherein the generated oxygen is discharged to an outside through the oxygen discharge port disposed at an upper surface of the case.

3. The oxygen generating apparatus of claim 2, wherein the oxygen discharge port includes a plurality of oxygen discharge holes.

4. The oxygen generating apparatus according to claim 1, wherein the inlet port is provided at a position lower than a position of the water discharge port, and wherein the oxygen discharge port is provided at a position higher that the position of the water discharge port.

5. The oxygen generating apparatus according to claim 4, wherein the inlet port is provided at a bottom portion of a first side surface of the case, and wherein the water discharge port is provided at an upper portion of a second side surface of the case, which is opposite to the first side surface.

6. The oxygen generating apparatus according to claim 1, wherein a portion of the reaction enhancement device or the entire reaction enhancement device is provided between the inlet port and the water discharge port.

7. The oxygen generating apparatus according to claim 1, wherein the reaction enhancement device includes a plurality of stacked meshes, and wherein a catalyst is coated on each of the plurality of stacked meshes.

8. The oxygen generating apparatus according to claim 7, wherein the catalyst is manganese dioxide or potassium iodide.

9. The oxygen generating apparatus according to claim 7, wherein the plurality of stacked meshes of the reaction enhancement device is vertically stacked in the case of the oxygen generator.

10. The oxygen generating apparatus according to claim 1, wherein at least one of the first pipe or the second pipe includes a pump.

11. The oxygen generating apparatus according to claim 1, further including:
an air supply tube through which air containing oxygen is supplied into the hydrogen peroxide generator; and
an air discharge tube through which air from which the oxygen is removed in the hydrogen peroxide generator is discharged.

12. The oxygen generating apparatus according to claim 11, further including an air pump that supplies the air containing oxygen in the air supply tube into the hydrogen peroxide generator in a bubble shape.

13. The oxygen generating apparatus according to claim 11, wherein the hydrogen peroxide generator includes an anode, a cathode, and a membrane provided between the anode and the cathode.

14. The oxygen generating apparatus according to claim 11, further including a water supply device through which water from outside of the oxygen generating apparatus is supplied into the hydrogen peroxide generator.

15. The oxygen generating apparatus according claim 1, wherein the heater is provided adjacent the inlet port.

16. The oxygen generating apparatus according to claim 1, wherein the heater is provided at an inner lower portion of the oxygen generator.

17. An oxygen generating apparatus, comprising:
a hydrogen peroxide generator that generates hydrogen peroxide;
an oxygen generator that generates oxygen using the hydrogen peroxide generated in the hydrogen peroxide generator;
a first pipe through which the hydrogen peroxide generated in the hydrogen peroxide generator is transferred into the oxygen generator; and
a second pipe through which water generated in the oxygen generator is transferred into the hydrogen peroxide generator, wherein the oxygen generator includes:
a case including an inlet port through which the hydrogen peroxide generated in the hydrogen peroxide generator is introduced, a water discharge port through which the water is discharged, and an oxygen discharge port through which the oxygen is discharged; and
a reaction enhancement device that enhances a reaction of the hydrogen peroxide introduced through the inlet port, and wherein the reaction enhancement device includes a light emitting device that irradiates light onto the hydrogen peroxide introduced into the case.

18. The oxygen generating apparatus according to claim 17, wherein the light emitting device includes an ultraviolet lamp provided adjacent the water discharge port.

19. The oxygen generating apparatus according to claim 17, wherein the light emitting device includes an ultraviolet lamp provided between die inlet port and the water discharge port.

* * * * *